United States Patent [19]

Caine

[11] Patent Number: 5,601,267
[45] Date of Patent: Feb. 11, 1997

[54] AWNING ROD BRACKET

[75] Inventor: Donald R. Caine, Greensboro, N.C.

[73] Assignee: Camco Manufacturing, Inc., Greensboro, N.C.

[21] Appl. No.: 373,611

[22] Filed: Jan. 17, 1995

[51] Int. Cl.⁶ ........................................ F21L 15/08
[52] U.S. Cl. ..................... 248/223.41; 248/225.11; 248/298.1; 248/300; 248/307; 248/911; 248/912
[58] Field of Search ............... 248/223.41, 225.11, 248/300, 304, 298.1, 307, 911, 912

[56] References Cited

U.S. PATENT DOCUMENTS

| D. 334,531 | 4/1993 | Pelletier . | |
|---|---|---|---|
| 2,326,828 | 8/1943 | Camp | 248/307 X |
| 2,727,272 | 12/1955 | Hankin et al. | 248/223.41 X |
| 3,521,332 | 7/1970 | Kramer | 248/911 X |
| 3,927,315 | 12/1975 | Werry | 248/223.41 X |
| 4,771,897 | 9/1988 | Ho | 211/13 |
| 5,044,416 | 9/1991 | Murray | 160/22 |
| 5,094,285 | 3/1992 | Murray | 160/67 |
| 5,174,536 | 12/1992 | Pelletier | 248/339 |

OTHER PUBLICATIONS

Catalog pages of Howe & Bainbridge, Inc.; *Sailmakers' Hardware and Supplies.* (1972).
Catalog page of A & E Systems by Dometic Corporation (undated).

*Primary Examiner*—Ramon O. Ramirez
*Assistant Examiner*—Michael J. Jurgeon

[57] ABSTRACT

An awning rod bracket is provided which can be easily slid into preformed slots in awning rods. The bracket includes a pair of bolts opposingly mounted on a planar body which defines openings therein for receiving various types of attachments for supporting electrical cords or the like.

10 Claims, 2 Drawing Sheets

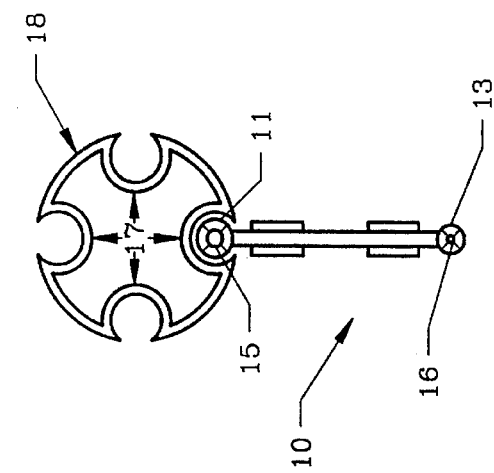
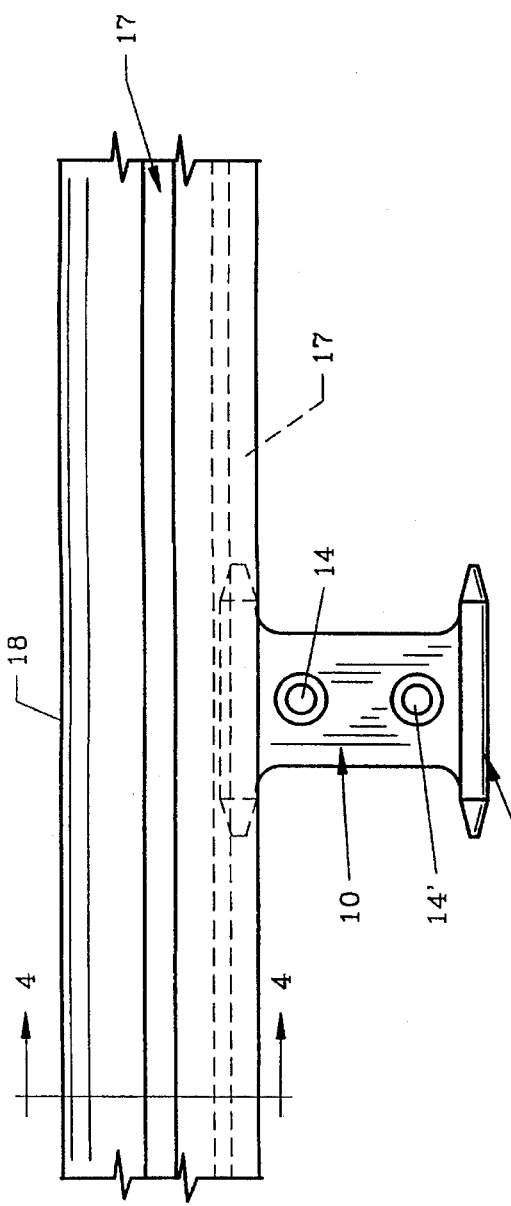
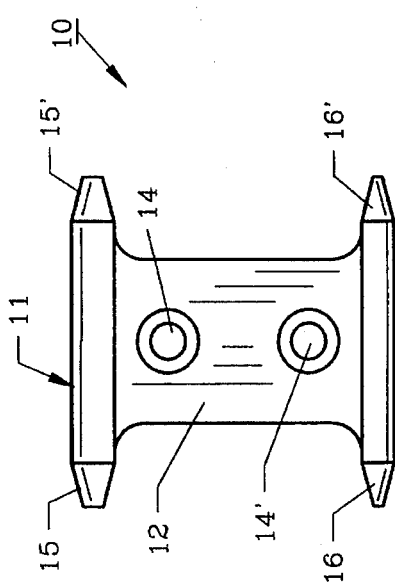
FIG. 1
FIG. 3
FIG. 4

AWNING ROD BRACKET

BACKGROUND OF THE INVENTION

1. Field of the Invention

The invention herein pertains to an awning rod attachment and particularly to a bracket for use with awning rods which are slotted as are conventionally used with awnings in the recreational vehicle field.

2. Description of the Prior Art and Objectives of the Invention

Awnings for recreational vehicles, modular homes, mobile homes and the like have become increasingly popular in recent years and with growing use, customers are requiring more accessories, enhancements and greater convenience. In order to hang lights and other items along the front of the awning, brackets have been devised which slide into preformed awning rod slots. Conventional awning brackets include one bolt attached to a body having an aperture therein. The bolt has a particular diameter and therefore a different bracket must be used for different size awning rod slots. The lack of versatility of the awning bracket has caused great concern and problems for users who may have to replace awning rods or brackets only to determine that the brackets that they purchased are not compatible with the slots of the existing rods or vice versa.

It is therefore one objective of the present invention to provide an awning rod bracket which includes a plurality of cylindrically shaped bolts to fit a variety of awning rod slots.

It is yet another objective of the present invention to provide an awning rod bracket which is easier to use than conventional brackets and which will receive multiple wires or attachments.

It is still another objective of the present invention to provide an awning bracket which includes a plurality of openings or apertures in the body.

Various other objectives and advantages of the present invention will become apparent to those skilled in the art as a more detailed presentation is set forth below.

SUMMARY OF THE INVENTION

The invention herein consists of an awning rod bracket which will fit a variety of awning rod slots. The bracket includes a pair of cylindrically shaped bolts having pointed ends to allow easy insertion into the various size awning rod slots. Each bolt is positioned along an opposite side of a substantially planar body portion and each bolt has a different diameter for accommodation of different slot sizes. The body portion also includes a pair of apertures which may be the same or different sizes for reception of metal or plastic hooks as are conventionally used for suspending lighting, electrical wires and other accessories.

BRIEF DESCRIPTION OF THE DRAWINGS

FIG. 1 demonstrates one embodiment of the awning rod bracket of the present invention;

FIG. 3 depicts a close-up view of the awning rod and bracket as shown in FIG. 2; and FIG. 4 shows an end view of the awning rod as seen in FIG. 2 with the bracket in one of the slots.

DESCRIPTION OF THE PREFERRED EMBODIMENT

Figure 2:
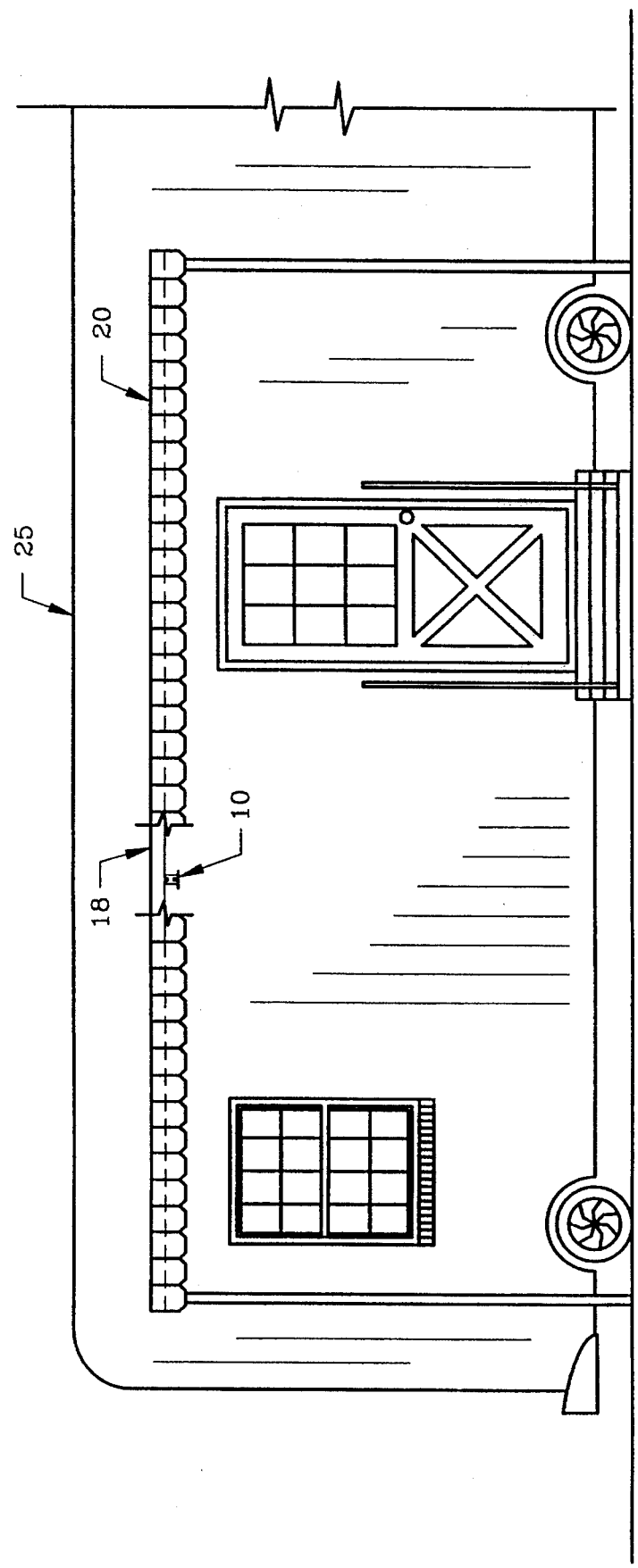
FIG. 2 illustrates the awning rod bracket as seen in FIG. 1 in use on a front awning rod of an awning as positioned on a conventional recreational vehicle.

The preferred form of the invention is illustrated in FIG. 1 whereby an awning rod bracket of the invention is formed from a polyvinyl chloride or other suitable flexible material. The bracket includes a first bolt which is substantially cylindrically shaped and includes pointed ends. The first bolt may have a diameter of 0.1875 inches and is integrally molded to the body. The body is substantially planar shaped and may have a thickness of approximately 0.125 inches and defines two openings which can be used for accepting S-type hooks or other attachments. The openings may for example, have a diameter of three sixteenths inches although other diameters or sizes can be selected. Also attached to the body is a second bolt which has a diameter larger than the first bolt. The second or larger bolt is cylindrically shaped and has a diameter of 0.25 inches with pointed ends to assist in loading the awning rod as shown in FIG. 4. The first and second bolts add rigidity and structural integrity to the bracket. Also, the pair of bolts allow ease in gripping and installing.

DETAILED DESCRIPTION OF THE DRAWINGS AND OPERATION OF THE INVENTION

For a more complete understanding of the invention and its use, turning now to the drawings, FIG. 1 shows awning rod bracket 10 which may be formed from a flexible material such as a relatively hard polyvinyl chloride, hard rubber, metal or other suitable material. Bracket 10 includes an upper or first bolt 11 which is joined to planar body 12 and also includes a lower, larger second bolt 13. As hereinbefore mentioned, bracket 10 may be formed by injection molding as is conventional in the trade. Body 12 also defines a pair of apertures 14, 14' for accepting "S" type hooks, brackets or other attachments. As would be understood, S-type hooks are useful for stringing electrical lines for lighting and other purposes.

Bolts 11 and 13 are substantially cylindrically shaped and have pointed ends 15, 15', 16, 16' respectively to provide easy insertion into awning slots 17 in awning rod 18 as seen in FIG. 4. To accommodate various size awning rod slots 17, first bolt 11 has a diameter of 0.1875 inches whereas second bolt 13 has a larger diameter of 0.25 inches. As would be understood, various diameters could be used for bolts 11 and 13 whether the same or different diameters as desirable, depending on the particular awning rods for use therewith. By providing two different diameters for bolts 11 and 13, a greater convenience is afforded the user. This structure allows the bracket to be interchangeable between different sized awning slots. Likewise, by having a plurality of apertures in body 12, a greater variety of attachments, S-hooks and the like can be utilized.

Awning 20 as shown in FIG. 2 is assembled with awning rod 18 therein. After sliding an appropriate number of brackets 10 into one or more slots 17, receptacles such as S-hooks are then available for attachment. Brackets 10 can be spaced along awning rod 18 as desired and once the S-hooks are in place an electrical cord having lights or the like therealong can be easily and releasably positioned within the S-hooks without interference or danger to awning 20. In FIG. 2 awning rod brackets 10 are useful on RV vehicle 25 but can also be used on mobile home awnings, patio or porch awnings, on tents and for other assemblies.

The illustrations and examples provided herein are for explanatory purposes and are not intended to limit the scope of the appended claims.

I claim:

1. An awning rod bracket for suspending an article, said bracket comprising: a first bolt, a planar body, said body defining an aperture, said first bolt attached to said body, a second bolt, said second bolt attached to said body, said first and said second bolts attached along opposite sides of said body, said first and said second bolts each having a cylindrical configuration, said first bolt having a diameter smaller than said second bolt.

2. An awning rod bracket as claimed in claim 1 wherein said bracket is linear.

3. An awning rod bracket as claimed in claim 1 wherein said body defines a plurality of apertures.

4. An awning rod bracket as claimed in claim 1 formed from a resilient material.

5. An awning rod bracket as claimed in claim 4 wherein said resilient material comprises polyvinyl chloride.

6. An awning rod bracket comprising: a first bolt, a planar body, said planar body defining an aperture, said bolt attached to said body, a second bolt, said second bolt attached to said body, said first and said second bolts substantially cylindrically shaped, said first bolt having a diameter smaller than said second bolt, said first bolt positioned along one side of said planar body, said second bolt positioned along the opposite side of said body, said first bolt in parallel alignment with said second bolt.

7. An awning rod bracket as claimed in claim 6 wherein said body defines a pair of apertures, said apertures positioned between said parallel bolts.

8. An awning rod bracket as claimed in claim 6 wherein said bracket it formed from a flexible material.

9. An awning rod bracket for suspending an article comprising: a central body, means to suspend an article, said article suspension means positioned on said body, a plurality of bolts, said bolts attached to said body, said bolts being cylindrically shaped, one of said plurality of bolts having a diameter less than another of said bolts.

10. An awning rod bracket as claimed in claim 9 wherein said bolts are opposingly mounted on said body.

* * * * *